United States Patent [19]

Lawson

[11] 3,773,408

[45] Nov. 20, 1973

[54] TAPE AND FILM SYNCHRONIZING APPARATUS

[75] Inventor: Peter V. O. Lawson, New York, N.Y.

[73] Assignee: Optasound Corporation, New York, N.Y.

[22] Filed: Sept. 29, 1970

[21] Appl. No.: 76,437

[52] U.S. Cl. .................................................. 352/16

[51] Int. Cl. .......................................... G03b 31/04

[58] Field of Search .................. 352/15, 16, 17, 22, 352/31

[56] References Cited

UNITED STATES PATENTS

| | | | |
|---|---|---|---|
| 3,457,005 | 7/1969 | Goodman | 352/17 |
| 3,620,609 | 11/1971 | John | 352/17 |
| 2,354,583 | 7/1944 | Eddy | 352/16 |
| 2,932,235 | 4/1960 | Ochiai | 352/17 |
| 3,045,158 | 7/1962 | Reinsch | 352/16 X |

*Primary Examiner*—Samuel S. Matthews
*Assistant Examiner*—Michael L. Gellner
*Attorney*—Ryder, McAulay and Hefter

[57] ABSTRACT

A movie camera-tape deck or recorder synchronization apparatus. The camera includes a control circuit having a manual and an electrically operated switch. The manual switch controls the flow of electrical energy to a coil which when energized closes a relay in the control circuit of the tape deck. With the relay closed a solenoid is energized which places the pinch roller on the tape deck in engagement with the tape and current is directed to the tape deck motor. Thus, sound is recorded on the tape in the tape deck. The tape includes sprocket holes and means are provided for producing a pulse each time a sprocket hole moves past a certain location. These pulses close the electrically operated switch in the camera circuit so that the camera motor receives power and thus the camera and tape deck are synchronized with each other.

12 Claims, 5 Drawing Figures

INVENTOR
PETER LAWSON
BY Kurschsten, Kurschsten, Ottinger & Frank
ATTORNEYS

INVENTOR
PETER LAWSON
BY Kurschoten, Kurschoten
Ottinger & Frank
ATTORNEYS

TAPE AND FILM SYNCHRONIZING APPARATUS

BACKGROUND OF THE INVENTION

1. Field of the Invention

Movie camera and tape deck synchronization apparatus.

2. Description of the Prior Art

There has been a great deal of interest recently by amateur movie makers in making sound films. The traditional approach followed by amateur movie makers in making sound films has been to have the sound recorded on tape which is moved in synchronization with movement of a film past a camera lens. HOwever, it is extremely difficult to synchronize a tape and film in this way. This is particularly true if there are frequent stops and starts in the recording on the tape and the movement of the film past the camera lens.

The prior art recognized this problem and taught, many techniques in attempting to overcome it. However, many of these techniques were ineffective and also were so expensive as to place them out of reach of the amateur movie maker.

With the gain in interest in economically making sound films, it is readily apparent that if a way could be devised for making sound movies which is cheaper than using a conventional sound on film technique and which is reliable in operation it would find widespread use.

SUMMARY OF THE INVENTION

It is therefore an object of the present invention to provide improved means for synchronizing the movement of a tape past a recording head with the movement of a film past a camera lens.

A still further object of the present invention is to provide apparatus that can control the operation of a tape deck simultaneously with the control of a movie camera.

A yet further object of the present invention is to provide a system for controlling a camera and tape deck so that the camera and tape deck will always run in synchronization.

A further object of the present invention is to provide an improved method and apparatus for simultaneously controlling the operation of a tape deck and movie camera.

Briefly described, this invention in one form comprises a sound recording device such as a magnetic tape recorder or deck having an idler wheel and a motor driven capstan for transporting the magnetic tape past a recording head. The tape is perforated along one edge. An optical system is used for reading movement of the tape and operating an electronic switch for controlling actuation of a camera. The optical system includes a light source on one side of the tape and a photocell on the other side of the tape. The perforations permit light rays from the light source to project intermittently onto the photocell which in turn produce a corresponding electrical signal for closing the electronic switch.

The recorder is adapted to be used in combination with an electrically operated visual image recorder such as a battery operated motion picture camera. The camera includes an on-off switch for making and breaking the camera motor circuit and an electrical switch which is closed periodically in correspondence with each opening of the camera shutter providing an electrical synchronization signal.

The camera and recorder are electrically connected by a cable to provide circuit linkage between the camera motor power source and the on-off switch and the tape recorder and to place the tape recorder electronic switch in the camera motor circuit. Closing of the electronic switch as a result of the signal provided by the photocell energizes the camera motor. The electrical interconnection also utilizes the synchronization signal to open the electronic switch after it has been closed by the pulse from the photocell. Opening the electronic switch stops operation of the camera motor. Therefore, the camera motor is controlled by the electronic switch and, consequently, is the slave of the tape recorder.

In order to simultaneously record visual images and sound, the operator closes the conventional tape recorder on-off switch and the camera switch causing the tape recorder to operate. With the tape recorder operating, the magnetic tape passes between the light source and photocell producing an electrical pulse which closes the electronic switch thereby energizing the camera motor and causing the film to move past the lens. As each frame of the film is exposed the synchronization signal is received from the camera which is directed to the tape recorder circuit to open the electronic switch turning the camera motor off until such time as the next perforation through the magnetic tape passes the photocell producing a pulse and reclosing the electronic switch to again actuate the camera motor. In this manner the camera is energized for movement and exposure of a single frame and each frame of the film corresponds to a precise portion of the magnetic tape defined by the perforations. Because the camera is slaved to the tape recorder, the camera will not operate if there is a defect in the recorder, such as if the recorder is not operating, if the magnetic tape is improperly placed within the recorder, if the light source is not operating, or if the tape is used up. In contrast to previous systems the synchronization system of this invention does not involve comparison of the operating speeds of the tape recorded and camera and appropriate adjustment. This system provides direct control and energization of the camera by the tape recorder which sequentially pulses the camera on for only one frame at a time.

The invention accordingly consists in the features of construction, combination of elements and arrangement of parts which will be exemplified in the devices hereinafter described and of which the scope of application will be indicated in the appended claims.

DESCRIPTION OF THE PREFERRED EMBODIMENTS

Figure 1:
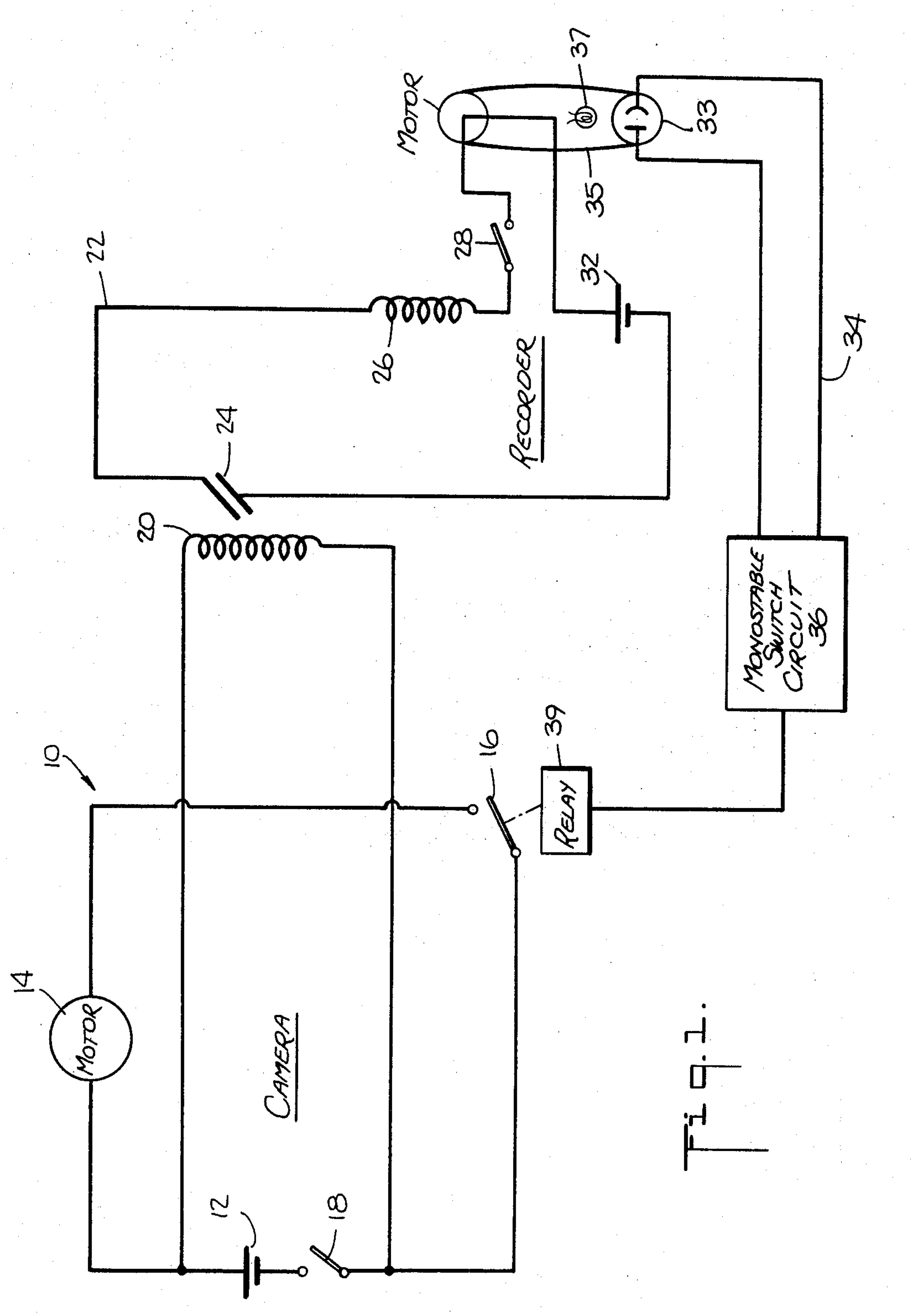
FIG. 1 is a schematic illustration of an embodiment of the present invention.

In FIG. 1 of the drawings an embodiment of the present invention is schematically shown and includes a camera circuit 10 having a source of DC voltage 12 which may be a conventional battery. Placed in series with source 12 is camera motor 14 and a complete circuit is provided between source 12 and motor 14 when switches 16 and 18 are closed.. Switch 18 is the camera on-off switch whereas switch 16 is an electrically operable switch, the control for which will be hereinafter described.

A coil 20 is in series with source 12 and when switch 18 is closed is energized. In the circuit as just described motor 14 and switches 16 and 18 are preferably located on the camera, with there being suitable wiring leading from the camera to coil 20 which is located in a tape deck whose control circuit 22 is shown in the drawings. Circuit 22 includes a relay 24 which is normally open and which is closed when coil 20 is energized. Located in series with relay 24 is a coil 26 which, when energized, places a pinch roller (not shown) in engagement with the tape which is being recorded on in the tape deck. A switch 28 is located in circuit 22 and is a part of the control on the tape deck. Unless the switch is closed the tape deck will not function and, as will hereinafter be apparent, unless this occurs the camera motor will not run.

Located in series with switch 28 is tape deck motor 30 and a DC voltage source 32. Source 32 may be supplied by appropriate batteries, or by rectifying any suitable AC source. The tape which is driven by motor 30 is schematically shown by reference numeral 35 and includes sprocket holes and is passed about a photoelectric cell 33. A light source 37 directs light at the photo cell. As a result pulses are produced by the cell each time a sprocket hole passes the cell and allows light to reach the cell. A wire 34 places photoelectric cell 33 in circuit with a monostaple switch circuit 36 which can be conventional and, which includes switch closing means 39. Monostable switch circuit 36 when receiving a pulse, closes switch 16 via means 39 and when not receiving a pulse allows said switch to be in an open position.

In normal operation the operator of camera 10 closes switch 18 so that coil 20 is energized. In a like fashion, switch 28 on the tape deck is closed. When coil 20 is energized, relay 24 is closed and current flows through coil 26 and motor 30. The flow of current through coil 26 places the pinch roller in engagement and the flow of current through motor 30 moves the tape past the recording head of the tape deck so as to record thereon. The tape is moved past and between light source 37 and photoelectric cell 33 so that the photocell produces a series of pulses which are directed to monostaple circuit 36. Upon receiving each pulse from photoelectric cell 33 monostable circuit 36 via means 39 closes switch 16 so that there is a complete circuit with respect to camera motor 14 and the camera motor is pulsatingly operated.

If camera switch 18 is opened, the flow of current to camera motor 14 is halted as is the flow of current to coil 20. As a result relay 24 opens, coil 26 is deenergized and motor 30 stops rotating. Thus, the tape deck ceases to operate as long as the camera is not operating. If camera switch 18 is closed and for some reason tape deck switch 28 is open and the tape deck will not record and the camera motor will not operate. This is because there will be no pulse directed by photoelectric cell 33 to monostable circuit 36 and switch 16 will be open, opening the circuit between camera motor 14 and source 12. Thus it can readily be seen that a system of interlocks is provided such that the tape deck cannot operate without the camera operating, and vice versa. As a result, synchronization is assured even through repeated starts and stops of the camera and tape deck.

Figure 2:
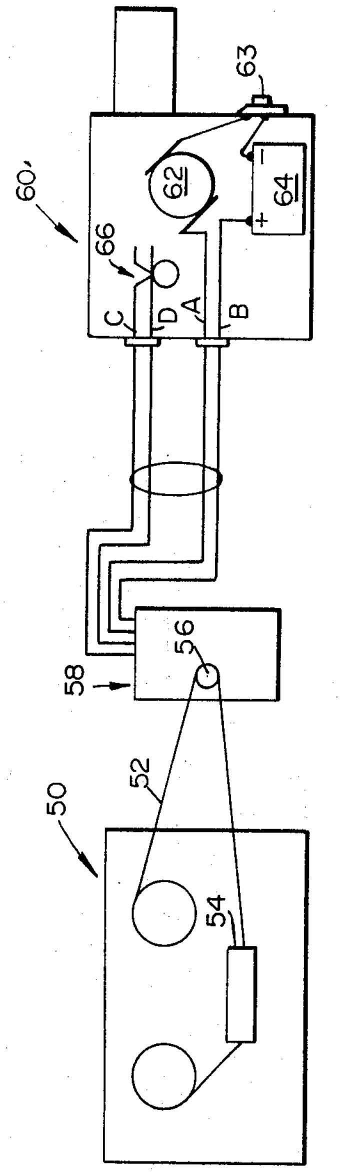
FIG. 2 is a schematic illustration of an alternate embodiment of the present invention.
Figure 3:
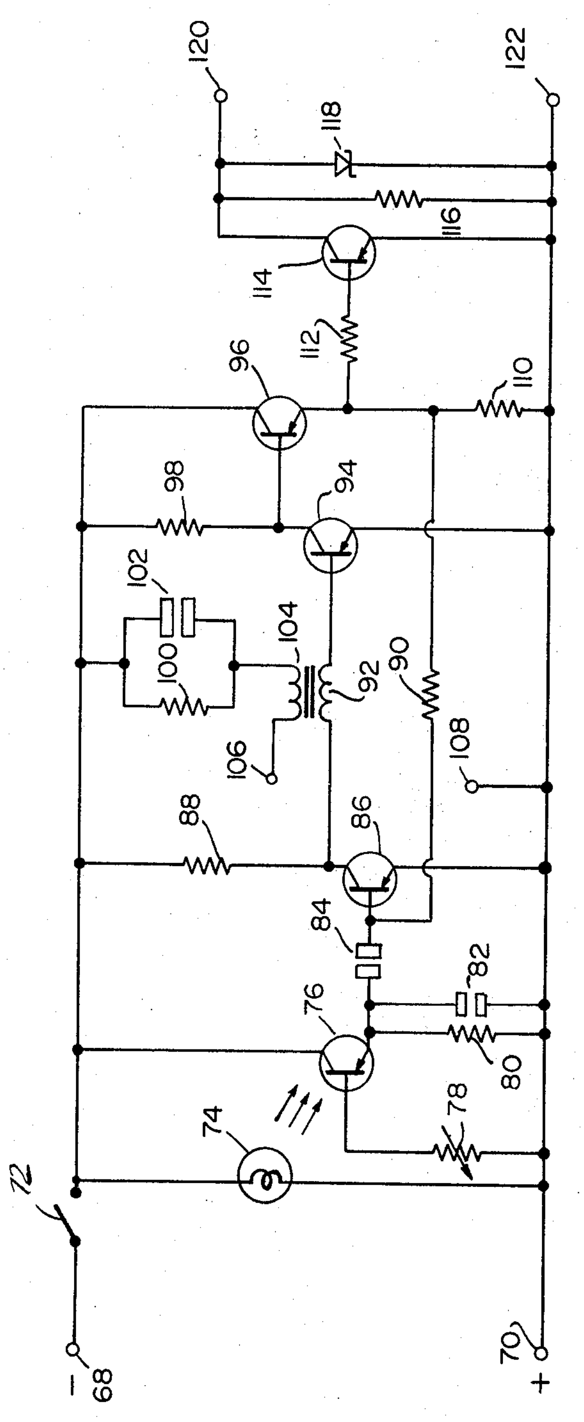
FIG. 3 is a schematic illustration of the circuit that is used in the invention disclosed in FIG. 2.

In FIGS. 2 and 3 of the drawings a further embodiment of the present invention is shown. In FIG. 2 of the drawings a tape recorder 50 is shown having a perforated tape 52 which is directed past a recording head 54 and about a capstan 56. Capstan 56 is part of a synchronizer 58 circuit which is shown in IFG. 3 and which will be hereinafter described in greater detail. A modified camera 60 is shown in FIG. 2 and includes a motor 62, a switch 63 and a source of direct voltage 64.

Camera 60 is modified by having a pulsing means 66 made a part thereof. Pulsing means 66 produces a pulse each time a frame of film is passed in front of the camera lens. The pulse from pulsing means 66 is connected to synchronizer 58 and motor 62 is controlled by the synchronizer.

As can be seen in FIG. 3 the circuit of synchronizer 58 includes a source of voltage which is applied across terminals 68 and 70 and includes an on-off switch 72. An exciter lamp 74 is provided and directs light at capstan 56 and, a light sensitive transistor 76 is in capstan 56. Transistor 76 has a base which receives light pulses from the exciter lamp as the sprocket holes in the tape pass the capstan. Transistor 76 is connected to switch 72 and via variable resistor 78 to terminal 70. A fixed resistor 80 connects the emitter of transistor 76 to terminal 70 and a capacitor 82 connects the emitter of the transistor to the terminal. A capacitor 84 places the base of a transistor 86 in circuit with the junction of transistor 76 and resistor 80. The emitter of transistor 86 is in circuit with terminal 70 and the collector thereof is connected via resistor 88 to switch 72. A resistor 90 is connected between capacitor 84 and the base of transistor 86 for a reason that will soon be apparent. A coil 92 is in circuit with the junction between the collector of transistor 86 and resistor 88 and the base of transistor 94. The collector of transistor 94 is in circuit with the base of transistor 96. Transistor 94 is connected to terminal 70 and via resistor 98 to switch 72. A resistor 100 is in parallel with a capacitor 102 with one junction between these elements connected to switch 72. A coil 104 is connected to the other junction between resistor 100 and capacitor 102 and leads to a terminal 106. A terminal 108 is located as shown in FIG. 3. A resistor 110 connects terminal 70 to transistor 96 and the junction between the resistor and the transistor is in circuit with a resistor 112 which leads to the base of a transistor 114. Transistor 114 is in parallel with a resistor 116 and a Zener diode 118 as shown in FIG. 3. Terminals 120 and 122 are placed in parallel with Zener diode 118. Resistor 90 is connected to the junction between resistors 110 and 112.

Leads A and B in FIG. 2 which lead to motor 62 and source 64, respectively, are connected to terminals 120 and 122. Leads C and D which are in circuit with pulsing means 66 are connected to terminals 106 and 108. The circuit of FIG. 3 as will be apparent to those skilled in the art is an amplifier circuit and transistor 114 conducts when transistor 76 conducts.

The system operates as follows. Upon a pulse being received by the base of transistor 76 as a result of a sprocket hole on tape 52 passing about capstan 56 current is directed through the transistor causing the circuit to conduct and a flow of current to pass through transistor 114. As a result, a low resistance path appears between terminals 120 and 122 and motor 62 runs. Thus, the camera runs as the tape is moved past the recording head 54. The movement of the film past the camera lens causes pulsing means 66 to direct a pulse to terminals 106 and 108 which places a reverse voltage on the base of transistor 94 which stops transistor 114 from conducting shutting power to the motor. Power is not restored to the camera motor until the movement of the tape past capstan 56 produces another pulse to the circuit so that the cycle can continue. It is thus readily apparent that the camera becomes the complete slave of the tape recorder and the speed thereof is controlled automatically thereby.

Figure 4:
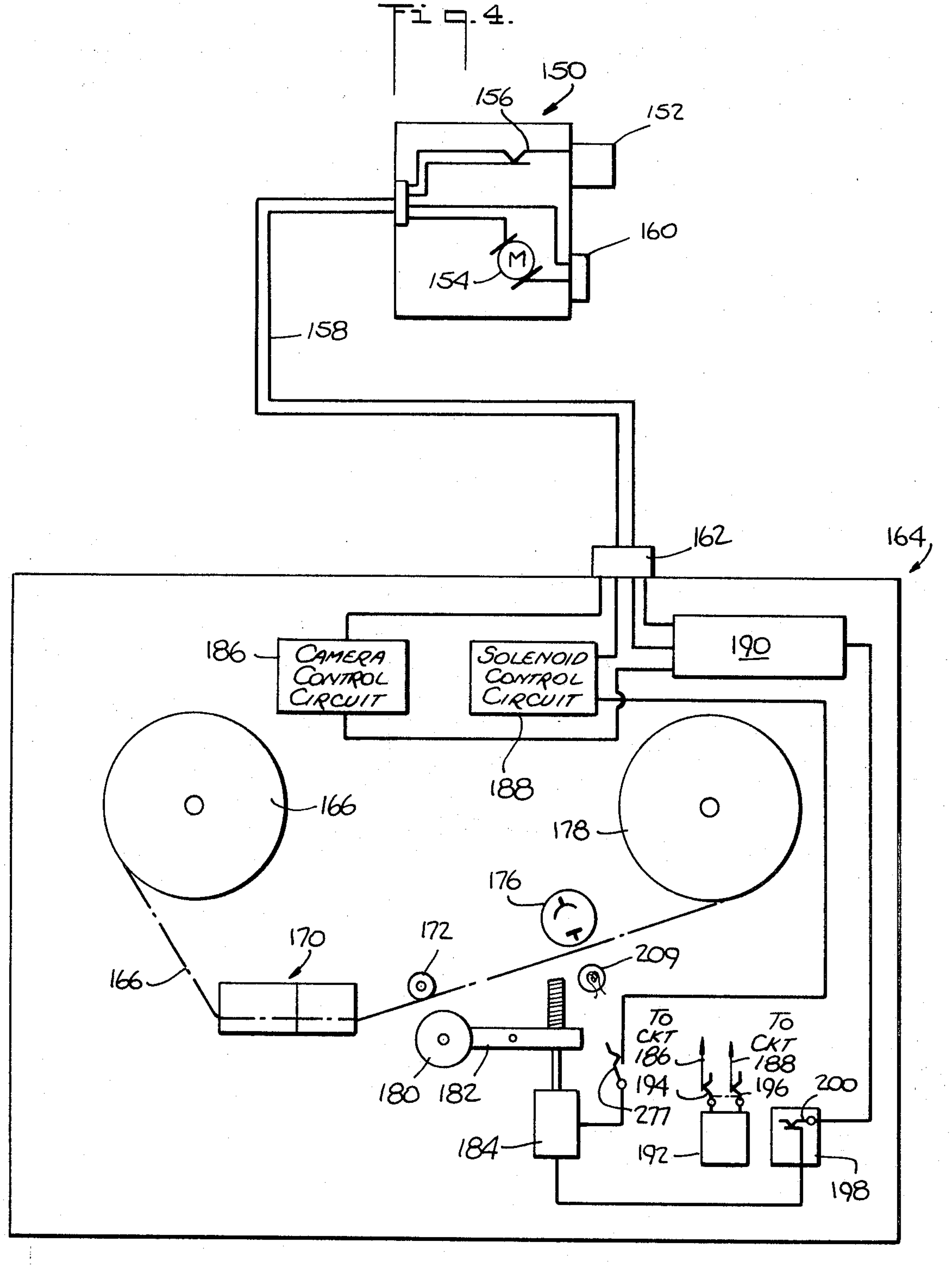
FIG. 4 is a schematic illustration of an alternate embodiment of the present invention.

In the embodiment of the invention shown in FIG. 4 a camera 150 is shown with a switch 160 and includes a lens 152 as well as a camera motor 154. A pulsing means 156 similar to the means 66 described in conjunction with FIG. 2 is provided and produces an electrical pulse each time the camera shutter opens and closes. A cable 158 leads from camera 150 and includes four wires as will hereinafter be described.

Cable 158 has one end received in a socket 162 on tape recorder or tape deck 164. It is to be understood that while reference hereinafter is made to a tape deck 164 any tape recording means could be used, and the term "tape deck" is intended to include any such recording means.

Located on tape deck 164 is a feed spool 166 which feeds a tape 168 past playing and recording heads 170. Tape 168 is perforated for a reason that will soon become apparent. After leaving the playing and recording heads tape 168 is directed past a capstan 172 and a tape capstan 176 having a light sensitive transistor. From there the tape is wound upon a take-up spool 178.

A pinch roller 180 is provided and the position thereof is controlled by a spring loaded arm 182 which is mounted on the pinch roller. A solenoid 184 is in operative relation with pinch roller 180 and when energized moves arm 182 and pinch roller 180 so that the pinch roller does not exert a pressure on the tape top and prevents the tape from being moved past the recording and playback heads.

A camera control circuit 186 is provided which controls the operation of the camera and a solenois control circuit 188 is provided which controls the operation of solenoid 184. A source of DC voltage 190 is provided on tape recorder 164. A record switch button 192 is provided, and when actuated closes switches 194 and 196. Switch 194 controls the supply of power to circuit 186 (FIG. 5) while switch 196 controls the supply of power to circuit 188. A replay switch button 198 is provided and when depressed closes switch 200 which energizes solenoid 184 via normally closed switch 277. Switch 277 leads to socket 162 and from there to the negative terminal of source 190. When there is no plug from cable 148 in the socket, switch 277 is isolated from source 190. When the plug is in the socket the switch is connected to source 190 and with switch 200 closed solenoid 184 is energized.

Figure 5:
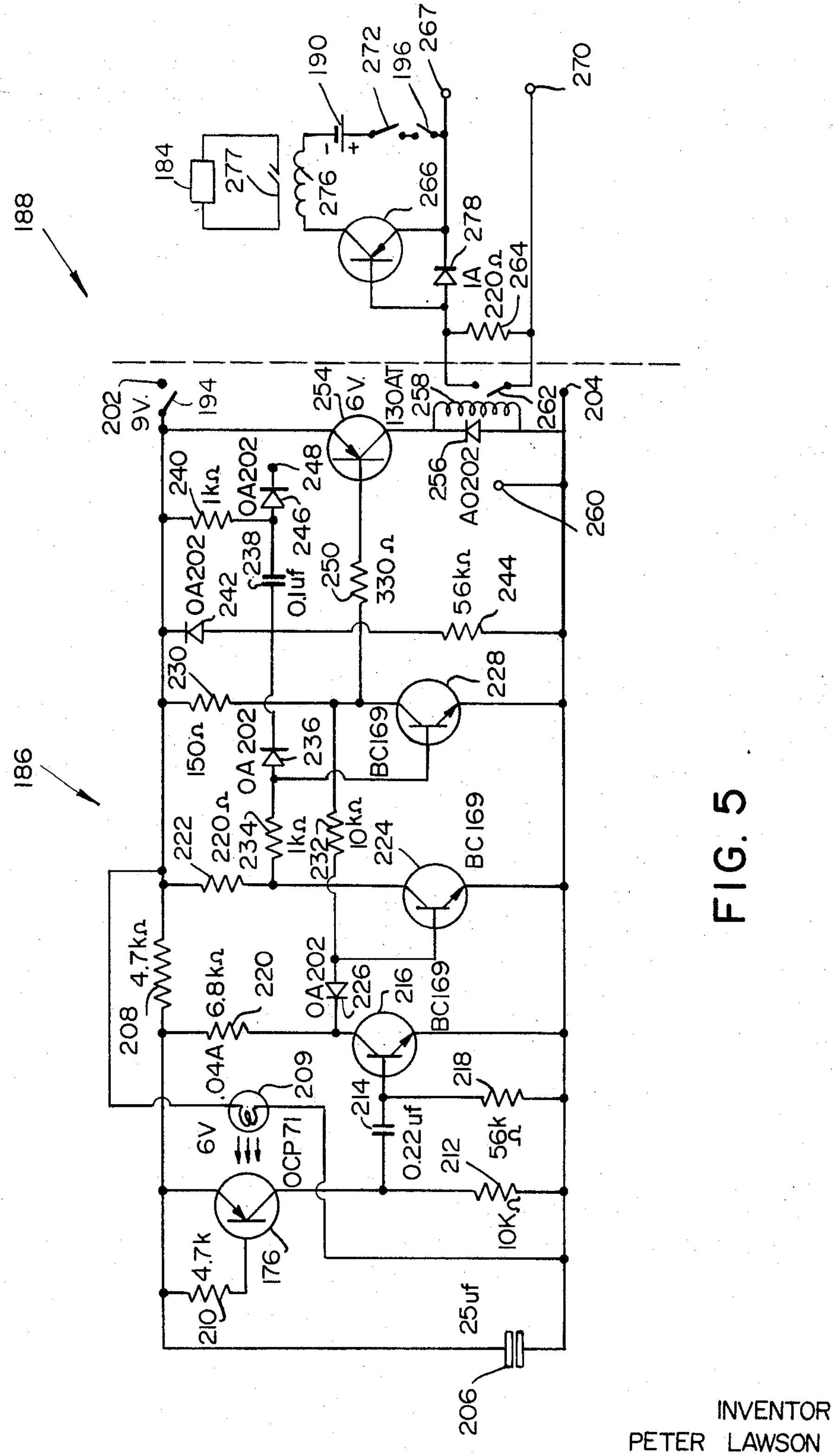
FIG. 5 is a detailed circuit diagram of the circuits that are used in the embodiment of the invention illustrated in FIG. 4.

In FIG. 5 of the drawings circuits 186 and 188 are specifically shown. Circuit 186 is connected to a direct current voltage source which may be source 190 (9 volts) by contact points 202, 204 upon switch button 192 being depressed and switch 194 being closed. A capacitor 206 and a resistor 208 are in circuit with contact points 202 and 204. An exciter lamp 209 (see FIG. 4) is in parallel with the nine volt supply to circuit 186, and is positioned to direct light at the light-sensitive transistor in capstan 176. The light sensitive transistor has its base via resistors 208 and 210, in circuit with contact point 202. The collector of the light sensitive transistor 176 via a resistor 212 is in circuit with contact point 204. Additionally, the collector of the light sensitive transistor is in circuit with a capacitor 214 which is connected to the base of transistor 216. The junction between capacitor 214 and transistor 216 is connected by a resistor 218 to contact point 204.

A resistor 220 along with resistor 208 places contact point 202 in circuit with the collector of transistor 216. A resistor 222 places contact point 202 in circuit with the collector of a transistor 224 with the emitter of said transistor being in circuit with contact point 204. The base of transistor 224 is in circuit with a diode 226 which has its polarity as indicated in the drawings and which is connected to the junction between resistor 220 and the collector of transistor 216.

A transistor 228 has its emitter in circuit with contact point 204 and its collector in circuit with a resistor 230 which is connected to contact point 202. Also in circuit with the collector of transistor 228 is a resistor 232, while a resistor 234 is in circuit with the base of transistor 228 and the junction between resistor 222 and the collector of transistor 224. A diode 236 is in circuit with resistor 234 and leads to capacitor 238. Capacitor 238 via resistor 240 is in circuit with contact point 202. A diode 242 is in circuit with contact point 202, with capacitor 238 and via resistor 244 with contact point 204 and a diode 246 is connected to a contact point 248. A resistor 250 is in circuit with the collector of transistor 228 and the base of a transistor 254. Transistor 254 has its emitter in circuit with contact point 202 and its collector in circuit with a diode 256. A coil 258 is in parallel with diode 256 and a contact point 260 is in circuit with resistor 244, diode 256 and contact point 204.

Contact points 248 and 260 are in circuit with the pulsing means 156 on camera 150, and two of the wires in cable 158 connect said pulsing means to these contact means while the other two wires connect the camera motor which is in circuit with the camera supply to points 267 and 270.

A reed switch 161 is operated by coil 258 and is a part of solenoid control circuit 188. A resistor 264 is in parallel with reed switch 262 with the resistor being in circuit with the base of transistor 266. Contact point 267 is in circuit with a switch 272 that is closed by the camera switch 160 being depressed, with switch 196 in circuit with source 190 which may be 9 volts. A relay coild 276 is in circuit with source 190 as well as with the collector of transistor 266. Relay 276 when energized opens switch 277. Switch 277 is in circuit with solenoid 184 and when closed with switch 200 closes the solenoid 184 to be energized. A diode 278 is in circuit with both the base and emitter of transistor 266. Excellent results can be obtained by having values assigned to the different components of the circuit of FIG. 5 as are shown therein.

In the normal operation switch buttons 192 and 198 are depressed. As a result thereof switches 194 and 196 are closed, energizing circuit 186. The depression of switch button 198 results in switch 200 being closed, which provides current to solenoid 184 so that pinch roller 180 is in the position seen in FIG. 4 and does not urge tape 168 against capstan 172. Consequently, the tape is not advanced past the recording heads.

When camera switch 160 is depressed, switch 272 is closed, energizing coil 276 which opens switch 277 and de-energizes solenoid 184. As a result thereof, pinch roller 180 moves into engagement with tape 168, and the tape is advanced past head 170. The movement of tape 168 past exciter lamp 208 allows a series of light pulses to be directed at the light sensitive transistor. A pulse of light reaches the light sensitive transistor each time a tape sprocket hole passes the exciter lamp. Circuit 186 includes a series of staged transistors for amplification purposes and as will be apparent to those skilled in the art flow through the light sensitive transistor results in flow through transistor 254. When transistor 254 conducts coil 258 is energized causing relay switch 262 to close. Consequently, contact points 267 and 270 complete the circuit with camera motor 154 and the camera power source. The camera motor then rotates and the film in the camera moves past projection lens 152. Each time a frame of film is moved past the projection lens 152, a pulse is produced by pulsing means 156 which pulse is connected to circuit 186 at contact points 248 and 260. The receiving of this pulse by circuit 186 stops transistor 254 from conducting. However, the continued movement of the tape past the capstan results in a light pulse being directed to the light sensitive transistor 176 which again causes transistor 254 to conduct.

I claim:

1. Apparatus for synchronizing the movement of film in a movie camera and the movement of tape in a tape deck comprising a camera control circuit, said camera control circuit including a first source of electrical energy, a camera motor, first switching means and a control element, said first switching means for placing said camera motor complete circuitry with said first source, a tape deck control circuit, said tape deck control circuit including in circuit a motor, a second source of electrical energy and a switch which is closed when said control element is energized effecting electrical connection of said tape deck motor to said second source, said tape deck control circuit further including means for producing a pulse each time a certain amount of the tape in the deck is moved past a specified location, said first switching means being responsive to each pulse for effecting energization of the camera motor by the source, and means for terminating energization of the camera motor after passage of a predetermined amount of film past a point in camera.

2. Apparatus according to claim 1 including second switching means, said second switching means when closed placing said camera control element in circuit with said first source regardless of the position of said first switching means and when said second switching means and said first switching means are closed, both said camera control element and said camera motor are in circuit with said first source.

3. Apparatus according to claim 2 wherein said camera control element is a coil, said tape deck switch being closed when said coil is energized.

4. Apparatus according to claim 2 wherein the pulsing means includes a photocell and a light source, the tape that is being recorded on including a series of sprocket holes and means for directing tape between the photocell and the light source so that a pulse is produced each time a sprocket hole is directed past a given location with respect to the photocell.

5. Apparatus for synchronizing the movement of film in a movie camera and movement of tape in a tape deck comprising first means for producing a pulse each time a certain portion of tape in the tape deck is moved past a given location, an electrically powered movie camera, said movie camera including a lens, a motor and second pulsing means for producing a pulse as each frame of film in the camera is moved past the camera lens, electrical control means responsive to said first pulsing means and said second pulsing means effecting energization of said camera motor in correspondence with each pulse from said first means and effecting termination of energization of said camera motor in correspondence with each pulse from said second means.

6. Apparatus according to claim 5 wherein the tape includes sprocket holes, said first pulsing means including a light source and a photocell, said tape passing between said light source and photocell such that a pulse is produced each time a sprocket hole passes a given location with respect to said light source and said photocell.

7. Apparatus according to claim 5 wherein said second pulsing means includes a switching arrangement in said camera that produces a pulse each time a frame of film is moved past the camera lens.

8. A system for synchronizing the movement of film in a movie camera and the movement of tape in a tape deck comprising a. an electrically powered camera motor, a source of electrical energy, a first switch in circuit with said camera motor and said source, and a control element in circuit with said source, said control element being responsive to the operation of said first switch, b. a tape deck motor for effecting movement of said tape, and a second switch in electrical connection with the tape deck motor, said second switch being responsive to said control element and controlling operation of said tape deck motor, c. means for producing a camera turn-on signal corresponding to the movement of tape past a point, d. means responsive to said turn-on signal for effecting energization of the camera motor by the source, e. means for producing a camera turn-off signal corresponding to the movement of a predetermined amount of film past a point in the camera, and f. means responsive to said turn-off signal for terminating energization of the camera motor.

9. The system of claim 8 wherein the turn-on signal producing means includes a light source and an optical sensor and wherein the tape includes a series of sprocket holes.

10. The system of claim 8 wherein the means for effecting energization of the camera motor includes a relay actuable by the turn-on signal, the relay being adapted to be placed in a first state by the turn-on signal, when said relay is in said first state said relay completes a circuit including the camera motor and electrical energy source and the camera is energized.

11. The system of claim 10 wherein the means for terminating energization of the camera motor includes a means for producing a turn-off signal, said relay being placed in a second state by said turn-off signal preventing energization of the camera motor.

12. The system of claim 8 wherein said predetermined amount of film is one film frame.

* * * * *